Oct. 1, 1935. T. BIRKENMAIER Re. 19,716

CONNECTER

Original Filed June 22, 1931. 3 Sheets-Sheet 1

Theodore Birkenmaier,
Inventor.
Delos F. Haynes,
Attorney.

CONNECTER

Original Filed June 22, 1931 3 Sheets-Sheet 2

Theodore Birkenmaier,
Inventor.
Delos F. Haynes,
Attorney.

CONNECTER

Original Filed June 22, 1931 3 Sheets-Sheet 3

Theodore Birkenmaier,
Inventor.
Dolor G. Haynes
Attorney

Reissued Oct. 1, 1935

Re. 19,716

UNITED STATES PATENT OFFICE 19,716

CONNECTER

Theodore Birkenmaier, St. Louis, Mo., assignor to W. N. Matthews Corporation, St. Louis, Mo., a corporation of Missouri Original No. 1,849,999, dated March 15, 1932, Serial No. 545,878, June 22, 1931. Application for reissue March 29, 1935, Serial No. 13,768

5 Claims. (Cl. 287—75)

This invention relates to connecters, and with regard to certain more specific features, to single unit, service connecters for connecting line wires and the like to service wires and the like.

Among the several objects of the invention may be noted the provision of connecters formed in one unit and which are screw and clamp actuated; the provision of a connecter of the class described which may be readily connected to the mid-portion of a length of wire without cutting or otherwise separating the wire, and which may be so connected with one hand of an operator; the provision of a connecter of the class described which is adapted to connect two wires together by rotation of a nut of said connecter in either a clockwise or counterclockwise rotation; the provision of a one unit connecter of the class described in which there is no deformation of metal required as the connecter is applied to the wires and which is adapted to connect wires of different sizes; the provision of a connecter of the class described which effects a more rapid connection between wires than has been heretofore possible with one unit connecters; and, the provision of connecters of the class described which are simple and economical to manufacture and which are strong. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated several of various possible embodiments of the invention, Fig. 1 is a front elevation of one form of the invention shown placed over a service connection and line wire but prior to tightening;

Similar reference characters indicate corresponding parts throughout the several views of the drawings.

Figure 1:
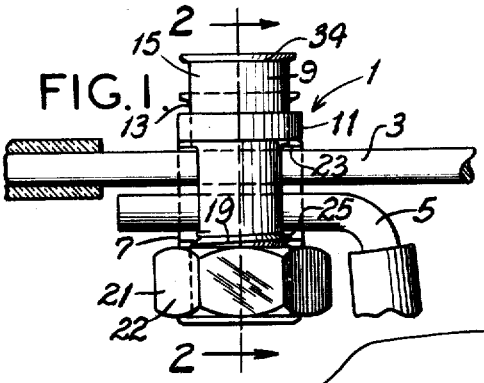

Referring now more particularly to Fig. 1, there is shown at numeral 1 a connecter positioned over a service wire or connection 5 and a line wire 3. In customary practice, the line wire 3 is stretched between poles or laid in permanent installation in underground conduits and the like and consequently such a wire has no ends which may be passed through a connecter block. Further, inasmuch as connections are generally made to such line wires as indicated at numeral 3, after the wires have been strung overhead or laid under ground, and because of the mechanical difficulties of splicing, and because it is inadvisable to cut the line wire 3, the connecter 1 must necessarily be adapted to join the service connection 5 to the line wire 3 without requiring an end of the line wire to be passed through a block, or without cutting or splicing the wires.

The present invention provides a one-piece or unit connecter for making a service connection with a line wire 3, which requires neither an end of the line wire nor any cutting of the wire to complete the connection and which may be rapidly applied with one hand.

The Fig. 1 embodiment of the present invention comprises two clamping jaws or shanks 7 and 9 permanently joined together by a band or collar 11. The collar 11 passes around a circular groove, depressed or cut-out portion 13 of the shank 7 and around a similar but much longer cut away portion 15 of the shank 9. The shank 7 has a second machined or cut-out and unthreaded portion 17 and the shank 9 has a threaded portion 19 opposite the groove 17. A nut 21 is permanently but freely mounted on the shank 7 and held in place by the groove 17. The threaded portion 19 of the shank 9 is adapted to thread into the nut 21. Thus both the nut and the shank 9 are permanently joined to the shank 7. The shanks 7 and 9 are substantially hemi-cylindrical and have faces 8 and 10 which are adapted to slidably engage one another. Together, the shanks 7 and 9 form a substantially complete cylinder, although positive, complete cylindrical (or circular cross-section) conformation is not essential to proper operation. Accordingly, the words "complete cylindrical" (or "complete circular cross-section") are herein defined as conformations more complete than hemicylindrical (or semi-circular conformations).

As the threaded portion 19 is threaded into and out of the nut 21, by rotating the nut relative to the two shanks, the portion 15 of the shank 9 slides freely through the collar 11 and consequently moves longitudinally with respect to the shank 7.

Figure 2:
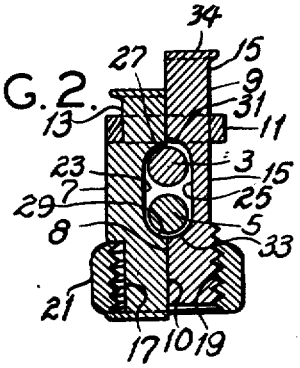
Fig. 2 is a vertical section taken on line 2—2 of Fig. 1.
Figure 5:
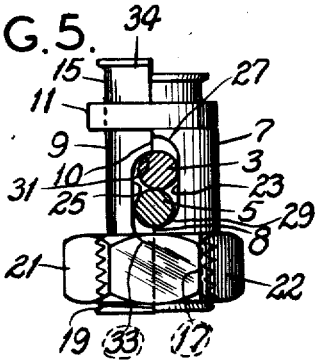
Fig. 5 is a side elevation showing one position of the connecter clamping the wires.
Figure 6:
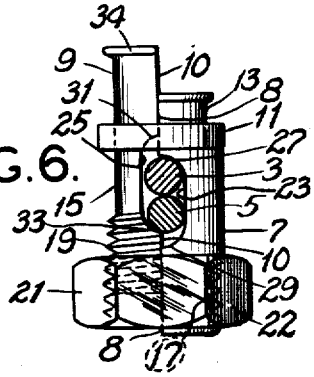
Fig. 6 is a view similar to Fig. 5 but showing the wires clamped by an alternative position of the connecter.

Both of the shanks 7 and 9 are provided with notches 23 and 25 respectively, the notches respectively having end walls 27 and 29, and 31 and 33. The notches 23 and 25 form the receiving portions of the shanks 7 and 9, and the end walls the clamping portions. Thus when the notches are juxtapositioned as shown in Fig. 2, the two wires 3 and 5 may be freely positioned between the notches but as shown in Figs. 5 and 6 when the wires 3 and 5 are positioned in the notches, and the latter are moved out of juxtaposition as by axially moving the shanks 7 and 9 relative to each other, the wires are clamped by the side walls.

Figure 3:
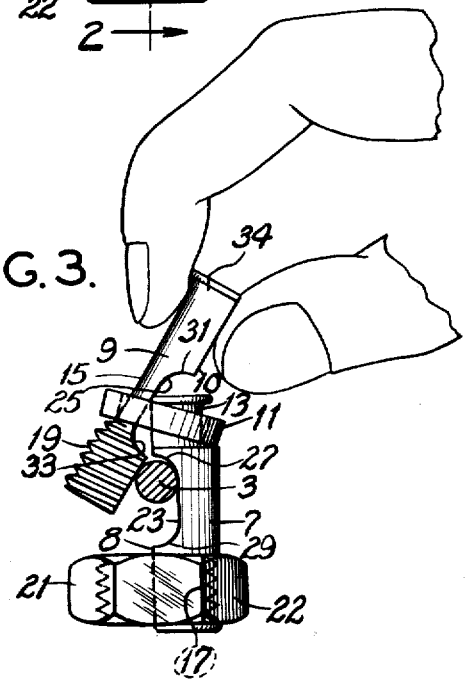
Fig. 3 is a side elevation of the connecter as it is being applied to the line wire.

It is to be noted that the shank 9 and its groove or notch 25 are both longer than the shank 7 and its notch. Thus the notch 25 is formed sufficiently long so that as the threaded portion 19 leaves the top of nut 21, the edge 31 of the groove 25 is aligned with the top edge of the shank. Thus as the shank 9 is raised still farther above the nut 21 the collar 11 is positioned around the cut away portion 15 and the groove 25 and the shank 9 is allowed movement other than axial movement with respect to the shank 7. Hence the shank 9 may be positioned angularly with respect to the shank 7 (Fig. 3), thereby leaving ample space between the nut 21 and notch 23 to receive a wire 3. Further, by holding the shank 9 at its top portion and tipping it, as shown in Fig. 3, the shank 9 automatically assumes a position at an angle to the axis of the shank 7, this being by reason of the low center of gravity of the connecter as a unit, caused by the relatively heavy nut 21 attached to the bottom end of the shank 7.

The application of the connecter 1 to join a service wire 5 to the line wire 3 is as follows:

The operator holds the connecter 1 at the top of the shank 9, as indicated at numeral 33, and after the threaded portion 19 of the shank 9 has been unthreaded from the nut 21, tilts the shank 9 thereby providing ample room to hook the connecter 1 over the wire 3, the wire 3 being positioned in the notch 23 of the shank 7 as hereinbefore described. The operator then drops the shank 9, and by reason of the low center of gravity of the connecter, a slight pushing of the top of the shank 9 in a counter-clockwise direction swings the threaded portion 19 against the shank 7, to a position to effect threading into the nut 21. In this position even though the operator's hand is entirely removed from the connecter and even though the wire 3 may be vibrating to some extent or moving as under the action of a high wind or the like, the connecter 1 will not drop off the wire 3, because as the connecter is hanging on the wire 3, as shown by the dotted line position in Fig. 4, the weight of the nut 21 keeps the connecter 1 from rotating about the wire to a position in which it could fall off the wire by reason of the wire passing out between the nut 21 and the bottom of the shank 9.

With the same hand, the operator now rotates the nut 21 in such a way as to thread the threaded portion 19 into the nut and continues to do so until the edges 29 and 33 of the notches 23 and 25 are substantially juxtapositioned. During this operation there are no critical periods when an inadvertent push may displace the connecter from the wire, as was the case with prior devices which required two-hand manipulation to ensure proper operation. After this operation has been completed, it is positively impossible to remove the connecter 1 from the wire 3 without unscrewing the nut 21 from the threaded portion 19, and consequently, the operater does not have to take any precautions whatsoever to prevent the connecter from falling from the wire. The end of the service wire 5 is now slid into position adjacent the wire 3 in the lower part of the hole or passage formed by the now juxtaposed notches 23 and 25 and inasmuch as the edges 29 and 33, and 27 and 31 are substantially juxtapositioned the wires 3 and 5 are freely movable in the passage bounded by the notches 23 and 25. Then the operator by means of a wrench or the like applied to wrench receiving portion 22 of nut 21 tightens the nut 21 so as to further force the portion 19 of the shank 9 into the nut. In this way the edge 31 of the nut 25 is gradually brought below the edge 27, and likewise the edge 29 of the notch 23 is gradually positioned above the end 33 of the groove 25. In other words, the edges 31 and 29 approach each other to positively clamp the two wires 3 and 5 together. In this way a good electrical, as well as a strong mechanical connection is made between the two wires 3 and 5, without cutting or splicing the wire 3.

If, however, after the nut 21 is once on the threads 19, the operator either inadvertently or intentionally rotates the nut 21 in a counterclockwise manner, the connecter 1 effects a clamping action as shown in Fig. 6. The counterclockwise rotation of the connecter 21 pushes the edge 33 of the shank 9 toward the edge 27 of the shank 7 and these two edges being pushed towards each other under the action of the threads effect the clamping of the wires 3 and 5 as is clearly shown in Fig. 6.

In order to remove the connecter 1 from the wires 3 and 5 and accordingly to disconnect the wire 5 from the line wire 3, it is only necessary to substantially align the respective edges 27, 29, 31 and 33 as shown in Fig. 2, pull the wire 5 from the connecter 1 and thread the portion 19 completely out of the nut 21 by the proper rotation of the nut 21 and then to completely remove the connecter 1 from the wire 3, which removal is easily effected by reversing the procedure as described in the application of the connecter to the wire 3.

Figure 4:
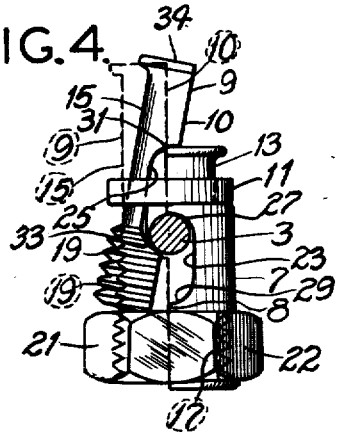
Fig. 4 is a view similar to Fig. 3, but showing the connecter hanging on the wire after the hand is removed, the dotted line alternate position showing how one element may be positioned by a slight touch.

An advantage of this connecter is that it is not only formed in one piece or unit but also is readily applied with one hand by the operator. Further, as the connecter is applied, as shown in Figs. 3 and 4, there is very little likelihood of the connecter falling from the line wire 3 as was formerly possible with the usual two-piece type of connecter. Another advantage of the invention is that the threaded portion 19 may be made sufficiently large to provide the amount of pressure necessary to effect a relatively substantial locking of the wires 3 and 5 by means of the shanks 9 and 7.

To facilitate manufacture, the ring is placed over the depressions and then the outer ends flanged over. The nut 21 is also placed in the unthreaded groove 17 and the end of the groove is then flanged.

Figure 9:
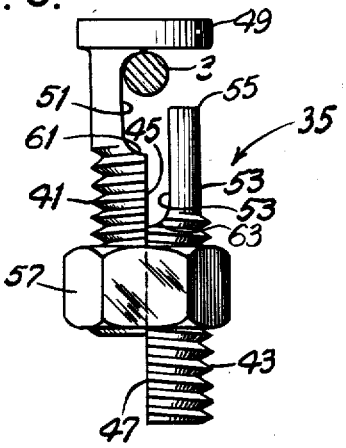
Fig. 9 is a side elevation showing the connecter of Fig. 7 opened and being applied to a line wire.
Figure 8:
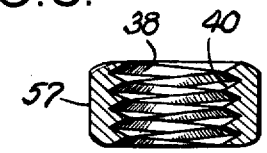
Fig. 8 is a vertical section of a double threaded nut of the connecter of Fig. 7.
Figure 7:
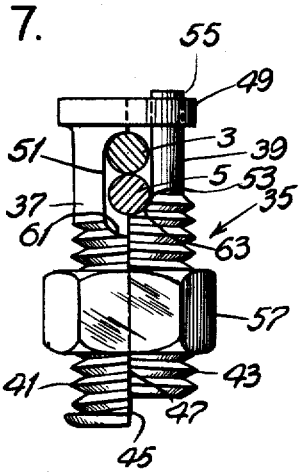
Fig. 7 is a side elevation of an alternative form of the connecter showing it clamping and connecting two wires.
Figure 10:
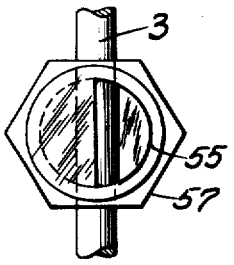
Fig. 10 is a top plan view of the connecter of Fig. 7.
Figure 13:
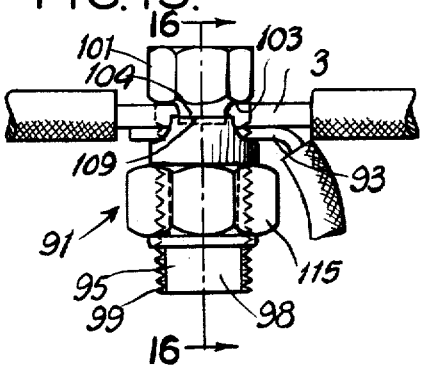
Fig. 13 is a front elevation of a preferred form of the invention shown placed over a line wire and clamping a service wire of a smaller diameter thereto.

Referring now to the modification of the invention shown in Figs. 7 through 9, at numeral 35 there is illustrated a connecter clamping together the two wires 3 and 5 which are similar to those shown in Fig. 1.

The connecter comprises two shanks 37 and 39, each shank having a threaded portion 41 and 43 and flat surfaces 45 and 47 respectively. The shank 37 has permanently and rigidly fastened thereto a band or ring 49 as shown in Figs. 7 and 9. Just below the band 49 a notch is cut out of the shank 37, said notch being long enough to freely receive the two adjacent wires 3 and 5 as shown in Fig. 7. The threaded portion 41 of the shank 37 has right hand threads.

The shank 39 has a cut away portion 53 which faces the notch 51 of the shank 37, and which extends to the upper end of the shank 39. The curved surface of the shank 39 opposite the cut away portion 53 is also cut away as shown at numeral 55 and is adapted to slip or freely move past the ring 49 as the shank 39 moves axially relative to the shank 37, the two surfaces 45 and 47 slidably engaging and moving past each other. The threads 43 of the shank 39 are left hand threads.

The two shanks 37 and 39 are permanently joined together by means of the nut 57. The nut 57 is provided with both right hand threads 38 and left hand threads 40 as shown in Fig. 8, the right hand threads 38 finding the threads 41 and the left hand threads 40 finding the threads 43. The two members or shanks 37 and 39 are threaded together by positioning the threaded portion 41 in the top of the nut, and the threaded portion 43 in the bottom of the nut, and then rotating the nut in a clockwise direction to cause the portion 41 to thread down into the nut and the portion 43 to thread up into the nut. It is seen that by this operation the two shanks 37 and 39 are moved longitudinally relative to each other, the faces 45 and 47 sliding on each other. After the portions 37 and 39 have been threaded into the nut 57, as shown in Fig. 9, the ends of the threads 41 at the lower end of the jaws 37 are swedged or otherwise deformed to prevent removal of the nut at that end (see numeral 2). It is impossible to remove the nut 57 from the top portion of the shank 37 which carries the collar 49 inasmuch as it has a larger diameter than the threaded portion itself. It is to be noted that the length of the threaded portion 43 is at least equal in length to the threaded portion 41, and when the nut 57 is at the extreme end of the threads 41, the threads 43 are well within the nut 57.

The cut away portions 51 and 53 have edges 61 and 63 respectively, and as the shank 39 moves relative to the shank 37 the edge 63 of the shank 39 moves to and away from the bottom of the collar 49.

The connecter 35 may be used to connect a line wire 3 and a service connecter wire 5 in the following manner:

The nut 57 is threaded to the far end of the threads 41, thereby dropping the top end of the shank 39 away from the collar 49 which positioning between the two shanks 37 and 39 gives ample room for the insertion of the line wire 3 between the two cut away portions 51 and 53. The operater now pushes the connecter upward to seat the wire 3 between the cut away portions 51 and 53 and then rotates the nut 57 in a clockwise direction or in the proper direction to move the two shanks 37 and 39 relative to each other to cause shank 39 to just pass into the collar 49, and at the same time to substantially align the edges or ends 61 and 63. At this stage the wire 3 is completely but freely locked in the connecter by the passage surrounded by the cut away portions 51 and 53, the collar 49 and the two edges 61 and 63. At this stage of the operation, the end 5 of the service wire is passed through the opening and the nut 57 is then rotated to force the edge 63 of the shank 39 toward the collar 49, thereby clamping the two wires 3 and 5 together between the edge 63 and the collar 49.

An advantage of this form of the invention is the differential action obtained between the left and right hand threads. It is to be understood that this form of the invention may be changed to employ, for instance, two right hand threads of different pitches whereby a relatively large mechanical advantage may be obtained by the relative motion of the shanks 37 and 39. In the present form, as shown in Figs. 7 through 9, the rapidity with which the two shanks 37 and 39 move with respect to each other under the action of the right and left hand threads is especially advantageous to complete the connection in a shorter period of time.

Figure 12:
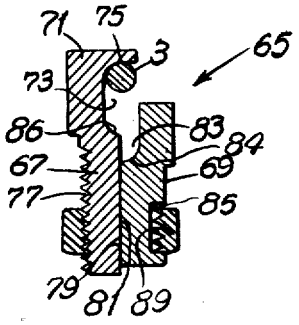
Fig. 12 is a vertical section of the connecter of Fig. 11 opened and being applied to a line wire.
Figure 11:
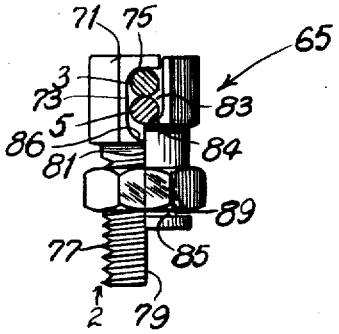
Fig. 11 is a side elevation of another modification of a one-piece connecter shown clamping two wires together.

Referring now to the modification of Figs. 11 and 12, which is a prototype of the form of Figs. 7 to 9, there is illustrated at numeral 65 a connector connecting the two wires 3 and 5 which is similar to those illustrated in the prior modifications. The connecter 65 comprises two shanks 67 and 69, the former shank comprising a head 71, which has a cutout portion 73 having a top edge 75, and a threaded portion 77 which has preferably right hand threads.

The shank 69 has a cutout portion 83 similar to that of the cutout portion 73, but which does not have the end portion 75 at the upper end thereof. The cutout portion 83 however, has a lower edge 84. A semi-circular, unthreaded groove 85 is formed in the shank 69 and is adapted to form the guiding seat for a nut 89.

The two shanks 67 and 69 have faced portions 79 and 81 which when the nut 89 is threaded on to the threads 77, are juxtapositioned and slide past each other as the nut is threaded up and down the threads 77, the shank 69 being carried by means of the nut seated in the groove 85. After the nut 89 has been threaded on to the jaw 67, the ends of the threads 77 are swedged or otherwise deformed to prevent the removal of the nut 89 from the shank 67.

The connecter 65 is applied to connect the two wires 3 and 5 by first positioning the shanks 67 and 69, by rotating the nut 89, to drop the top of the shank 69 below the edge 75 of the cutout portion 73 to allow ample room for the introduction of the wire 3. Then, as described in connection with the modification of Fig. 7, the connecter is pushed upwardly in such a manner as to seat the wire 3 between the cut away portions 73 and 83, and then the nut 89 is turned to axially push the shank 69 along the shank 67 to push the edge 84 of the cut away portion 83 toward the edge 75. The wire 3 being seated between the cut away portions prevents rotation of the connecter 65 relative to the wire 3 as the nut 89 is turned. After the edge 84 rises to substantial juxtaposition with respect to a corresponding edge 86 of the shank 67, the wire 3 is completely enclosed between the cutout portions 73 and 83 and consequently caught therein. The service wire 5 is now inserted between the cut away portions and the nut 89 is rotated to force the end 84 toward the edge 75 and accordingly to clamp the two wires 3 and 5 between the edges 84 and 75.

It is to be understood, in connection with the modifications of Figs. 7 and 11, that after the connecters 35 and 65 respectively have assumed the position as shown in Figs. 9 to 12, the other hand of the operator may be used to prevent rotation of the shanks 37 and 67 respectively, while the nuts 57 and 89 are being applied. Further, in these modifications both wires may be inserted at the beginning of the operation if so desired.

Referring now to the modification of Figs. 13 through 16, there is shown a preferred form of the invention, namely, a connecter which is adapted to connect substantially all sizes of line and service wires together and consequently is adapted to connect a relatively small service wire to a relatively large line wire as well as to connect wires of the same size.

The connecter as illustrated at numeral 91 is shown positively clamping a service wire 93 to a line wire 3, which wire 3 is similar to the line wires heretofore described. The service wire 93 has a substantially smaller diameter than the line wire 3.

The connecter 91 comprises a shank 95 and a clamping member 97, the former comprising a bolt shaped member having a hexagonal head 101, an exterior threaded portion 99, preferably extending over half way around the bolt shaped member, and a faced portion 98 opposite said threaded portion. The hexagonal head 101 is full size and has a notch or clamping portion 103 on the under side thereof, one edge of which is flush with the faced portion 98. The notch 103 has an outer edge 104.

Figure 15:
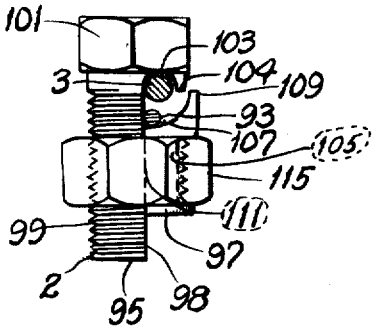
Fig. 15 is a view similar to Fig. 14 but showing the connecter in partially clamped position, and a service wire in place with the line wire but prior to the final clamping; and, Fig. 16 is a vertical section taken on line 16—16 of Fig. 13.
Figure 16:
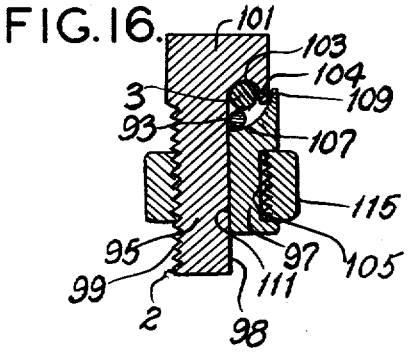

The member 97 is substantially thinner than the shank 95 and is also substantially shorter. It has a faced portion 111, a groove 105 oppositely disposed to the faced portion 111, and a notch or clamping portion 107 at the top thereof. The outer edge 109 of the notch 107 is adapted to just slide past the outer edge 104 of the notch 103 when the faces 98 and 111 are juxtaposed (Figs. 15 and 16).

The members 95 and 97 are held in position, in the faces 98 and 111 slidably engaging each other, by a nut 115 which is seated in the groove 105 of the member 97 and which threads on to the threads 99 of the shank 95. After the two members 95 and 97 have been thus assembled by the nut 115, the end of the threaded portion 99 of the shank 95 is deformed as shown at numeral 2 in order to positively prevent the removal of the nut 115 from the shank 95. It is thus seen that the two members 95 and 97 are joined together as a unit.

The faced portions 98 and 111 are substantially continuous throughout the length of the respective members 95 and 97, the notches 103 and 107 being formed respectively on the under side of the head 101 and the top portion of the member 97, in contradistinction to the positioning of the notches hereinbefore described in the modifications shown in Figs. 1 through 12. It is thus seen that at no time during the application of the connecter 91 to wires is it possible for a wire to slip down between a faced portion and a notched portion, which slipping thereinbetween would provide a relatively poor connection between the two wires. The inside surface of the notch 103 faces the inside surface of the notch 107 at all times and is at no time moved out of juxtaposition thereto. Consequently clamping by the two members 95 and 97 consists in moving the inner surfaces of the two notches 103 and 104 toward each other.

Figure 14:
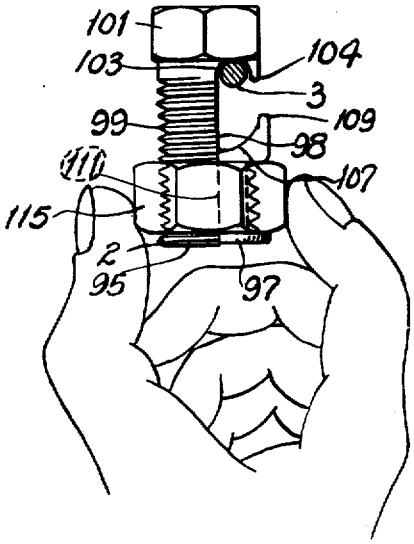
Fig. 14 is a side elevation of the connecter of Fig. 13 showing it being applied to the line wire.

The connecter 91 may be applied to clamp a line wire to a service wire in the following manner:

The connecter is opened, as shown in Fig. 14, by threading the nut 115 down on the shank 95 to allow sufficient room between the two end portions 104 and 109 for the passage of a line wire 3 therebetween. The nut 115 is then grasped by the hand of the operator, and the notch 103 hooked over the line wire 3, by passing the line wire between the edges 104 and 109. The operator then with the same hand threads the nut 115 up on the shank 95, relative rotation of the shank 95 to the wire 3 being prevented by the notched portion 103, until the two edges 104 and 109 are substantially flush with each other as shown in Fig. 15. In this position of the members 95 and 97, the wire is completely surrounded by the notches 103 and 107 of the members 95 and 97 and consequently the removal of the wire 3 from the members is positively prevented.

It is to be noted that at all times during the positioning of the members 95 and 97 around the wire 3, even though at times the hand of the operator may be entirely removed from the nut 115, there is no danger of the connecter 91 dropping off the wire 3 due to vibrations or other disturbances of the wire 3, inasmuch as the notch 103 provides a substantial recess for the wire 3. The low center of gravity of the connecter effected by the positioning of the relatively heavy nut 115 below the notch 103, prevents any rotation of the connecter 91 which would allow the connecter to drop from the wire.

The service wire 93 is now positioned below the wire 3, as shown in Figs. 13 through 16, by slipping the end of the wire 93 through the passage provided by the notches 103 and 107, and then threading the nut 115 farther on to the shank 95, thereby forcing the member 97 toward the head 101 of the shank 95 and thus forcing the two clamping portions toward each other to securely lock the two wires 3 and 93 together.

An advantage of this modification is that regardless of the sizes of the two wires connected, positive connection between the two is always insured.

A further advantage of this modification is that the increased threaded portion 99 of the shank 95 and the stocky construction of the member 97 substantially increase the available pressure which may be exerted between the notches 103 and 107 by forcing the member 97 against the head 101 of the shank 95. Further the provision of the full hexagonal head 101 provides an additional hold for a wrench whereby two wrenches, one applied to the nut and one applied to the head, may be employed to clamp the two wires together.

A further advantage of this modification is that the member 97 may be made by process of drop forging with the consequent substantial overall reduction in the cost in the manufacture of the connecter.

A general advantage of the invention is that the one-piece connecters thus provided to connect a service wire to a line wire are readily applied with one hand. Furthermore, no tool is required to deform the connecters as they are applied over the wires.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A connecter comprising a substantially hemicylindrical shank threaded at one end thereof, said shank having a notch in its plane surface intermediate its ends, a second substantially hemicylindrical shank associated with said first shank and forming therewith a substantially complete cylinder, said second shank also having a notch in its plane surface intermediate its ends, said second notch normally facing said first notch, a nut encircling one end of said shank, and means on said second shank for retaining said nut thereon, said nut being adapted to receive and engage the threaded end of said first shank, whereby, upon rotation of said nut, relative longitudinal motion is effected between said shanks, said notches being thereby displaced from facing position to clamp together a plurality of wires inserted therein.

2. A connecter comprising a substantially hemicylindrical shank threaded at one end thereof in one direction, said shank having a notch in its plane surface intermediate its ends, a second substantially hemicylindrical shank associated with said first shank and forming therewith a substantially complete cylinder, said second shank being threaded at one end thereof but in a reverse direction, said second shank having a notch in its plane surface normally facing said first notch, a nut threaded in two directions and engaging and holding in assembly the threaded ends of both said shanks, whereby, upon rotation of said nut, relative longitudinal motion is effected between said shanks, said notches being thereby displaced from facing position to clamp together a plurality of wires inserted therein.

3. A connector comprising a clamping portion and a threaded shank, said shank having a cross section less than a complete circle, a clamping member associated with said shank and having a cross section such that said shank and said member together have a substantially complete circular cross section, a nut engaging the threads on said shank and encircling said member, thereby holding said member to said shank, whereby, upon rotation of said nut, relative longitudinal motion is effected between said member and said shank, said member having a clamping portion facing said first-named clamping portion, said portions being shaped to receive and at least partially surround a plurality of wires, so that when said clamping portions are brought together by manipulation of said nut, said wires are clamped together, and an unthreaded portion on said shank permitting disengagement of said nut from the threads of said shank to receive said wires.

4. A connecter comprising a clamping portion and a threaded shank, said shank having a cross section less than a complete circle, a clamping member associated with said shank and having a cross section such that said shank and said member together have a substantially complete circular cross section, a nut engaging the threads on said shank and encircling said member, thereby holding said member to said shank, whereby, upon rotation of said nut, relative longitudinal motion is effected between said member and said shank, said member having a clamping portion facing said first-named clamping portion, said portion being shaped to receive and at least partially surround a plurality of wires, so that when said clamping portions are brought together by manipulation of said nut, said wires are clamped together, an unthreaded portion on said shank permitting disengagement of said nut from the threads of said shank to receive said wires, and means associated with said unthreaded portion for preventing separation of the shank and the remainder of the connecter, including the nut, when said nut is free of the threads.

5. A connecter comprising a clamping portion and a threaded shank having a cross section less than a complete circle, a clamping member associated with said shank and having a cross section such that the shank and said member together have a substantially complete circular cross section, a nut engaging the threads on said shank and encircling said shank, whereby, upon rotation of said nut relative longitudinal motion is effected between said member and said shank, said member having a clamping portion facing said first-named clamping portion, said portions being shaped to receive and at least partially surround a plurality of wires, so that when said clamping portions are brought together by manipulation of the nut said wires are clamped together, and an unthreaded portion associated with said shank on which the remainder of the connecter is loosely and tiltably, but non-removably held prisoner to said threaded shank.

THEODORE BIRKENMAIER.